(12) United States Patent
Horwath

(10) Patent No.: US 6,357,695 B1
(45) Date of Patent: Mar. 19, 2002

(54) RETICLE FOR USE IN A GUIDANCE SEEKER FOR A SPINNING PROJECTILE

(75) Inventor: Tibor G. Horwath, Falmouth, VA (US)

(73) Assignee: General Dynamics Ordnance and Tactical Systems, Inc., St. Petersburg, FL (US)

( * ) Notice: Subject to any disclaimer, the term of this patent is extended or adjusted under 35 U.S.C. 154(b) by 0 days.

(21) Appl. No.: 09/562,822

(22) Filed: May 1, 2000

Related U.S. Application Data

(62) Division of application No. 09/002,370, filed on Jan. 2, 1998, now Pat. No. 6,076,765.
(60) Provisional application No. 60/047,476, filed on May 23, 1997, and provisional application No. 60/034,006, filed on Jan. 2, 1997.

(51) Int. Cl.[7] ............................. G06F 19/00; F41G 7/00
(52) U.S. Cl. .................................... 244/3.16; 250/233
(58) Field of Search ............................. 244/3.13, 3.16; 250/203.7, 233, 206.3, 203.1, 342; 367/7

(56) References Cited

U.S. PATENT DOCUMENTS

| | | | | |
|---|---|---|---|---|
| 2,931,912 A | | 4/1960 | Macleish | 250/203 |
| 2,942,118 A | * | 6/1960 | Gedance | 244/3.16 |
| 2,967,247 A | * | 1/1961 | Turck | 250/203.7 |
| 2,981,842 A | * | 4/1961 | Kaufold et al. | 250/83.3 |
| 2,989,640 A | | 6/1961 | Turck | 244/3.16 |
| 3,009,065 A | * | 11/1961 | McKnight et al. | 250/203.7 |
| 3,021,096 A | * | 2/1962 | De Mott | 244/14 |
| 3,023,661 A | * | 3/1962 | McClusky et al. | 250/203.7 |
| 3,136,895 A | | 6/1964 | Whitney | 250/236 |
| 3,143,654 A | | 8/1964 | Aroyan et al. | 250/233 |
| 3,323,757 A | | 6/1967 | Cole | 244/3.16 |
| 3,332,641 A | | 7/1967 | Bezerie | 244/3.12 |
| 3,379,891 A | * | 4/1968 | Aroyan | 250/203.7 |
| RE26,887 E | * | 5/1970 | McLean | 244/3.16 |
| 3,612,701 A | * | 10/1971 | Bleicher | 356/172 |
| 3,642,233 A | * | 2/1972 | Bezerie | 244/3.16 |
| 3,733,133 A | * | 5/1973 | Chapman | 244/3.16 |
| 3,811,774 A | * | 5/1974 | Honeycutt et al. | 356/5.28 |
| 3,977,628 A | * | 8/1976 | Barron | 244/3.16 |
| 4,009,393 A | * | 2/1977 | Ashley, Jr. et al. | 244/3.16 |
| 4,014,482 A | | 3/1977 | Esker et al. | 244/3.13 |
| 4,020,339 A | | 4/1977 | Gustafson | 244/3.16 |
| 4,107,529 A | | 8/1978 | Chicklis et al. | 250/339 |
| 4,149,686 A | * | 4/1979 | Stauff et al. | 244/3.16 |
| 4,195,799 A | * | 4/1980 | Sogo et al. | 244/3.13 |
| 4,286,760 A | | 9/1981 | Couderc et al. | 244/3.16 |
| 4,300,736 A | | 11/1981 | Miles | 244/3.22 |
| 4,347,996 A | | 9/1982 | Grosso | 244/3.22 |
| 4,408,735 A | | 10/1983 | Metz | 244/3.22 |
| 4,482,107 A | | 11/1984 | Metz | 244/3.22 |
| 4,561,611 A | * | 12/1985 | Sinclair et al. | 244/3.16 |
| 4,967,065 A | | 10/1990 | Edwards | 250/203.6 |
| 5,054,712 A | | 10/1991 | Bar et al. | 244/3.22 |
| 5,076,694 A | * | 12/1991 | Aronowitz | 356/350 |
| 5,433,399 A | | 7/1995 | Becker et al. | 244/3.22 |
| 5,529,262 A | | 6/1996 | Horwath | 244/3.16 |
| 5,669,581 A | | 9/1997 | Ringer | 244/3.16 |

* cited by examiner

*Primary Examiner*—Michael J. Carone
*Assistant Examiner*—Denise J. Buckley
(74) *Attorney, Agent, or Firm*—Wiggin & Dana, LLP; Gregory S. Rosenblatt

(57) ABSTRACT

A reticle for a guidance seeker for spinning projectiles comprises a substrate; a pattern of a plurality of alternating light modulating structures, such as opaque and light transmitting, or light absorbing and light reflecting areas on the substrate such that an image of a target moving on the substrate will generate a plurality of pulses corresponding to the number of lines crossed by the image, the number of pulses increasing as the image moves outwardly from the center of the reticle; and a distinguishable, unambiguous, and singly periodic feature of the pattern, which is readily detectable every time the target image moves circumferentially, completing a full circle around the center of the reticle.

19 Claims, 7 Drawing Sheets

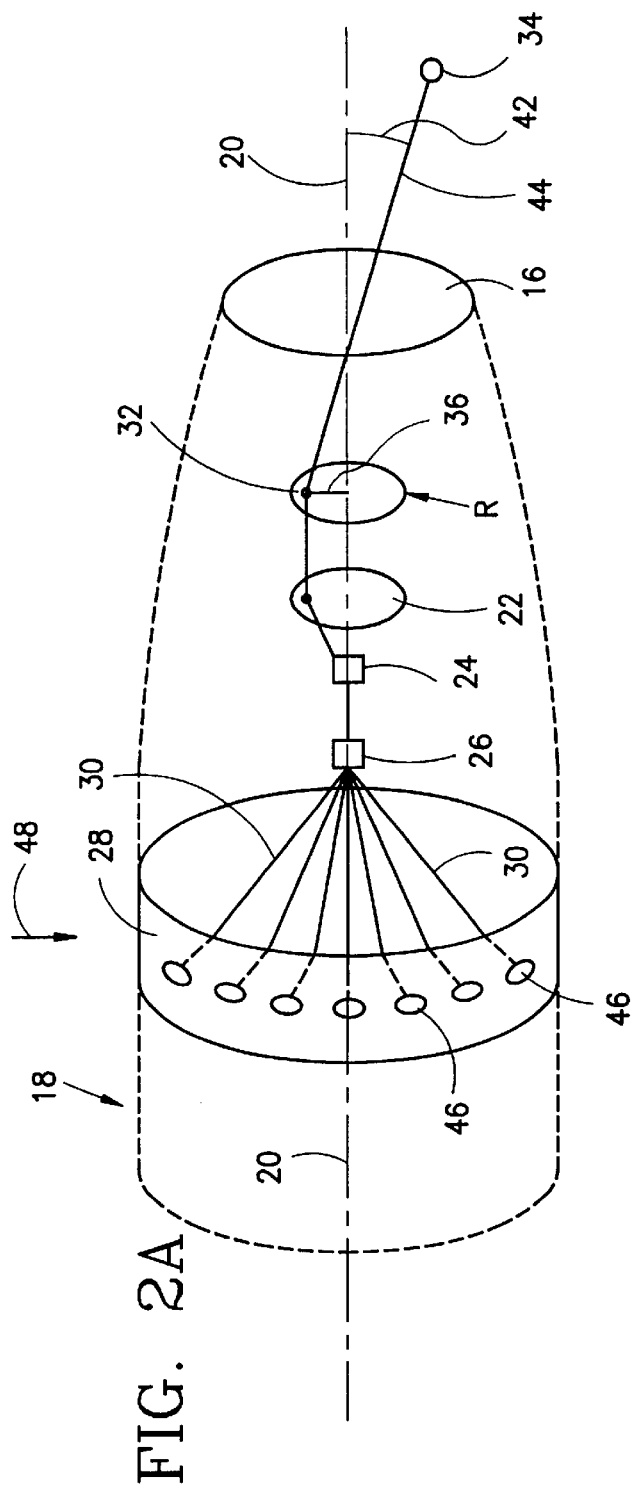
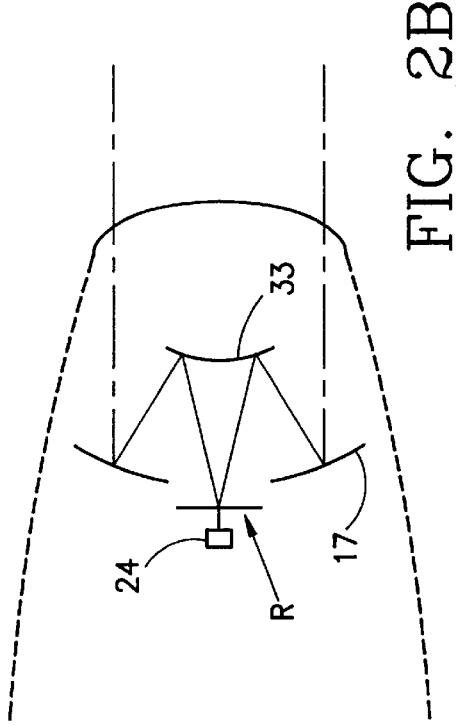
FIG. 2A
FIG. 2B
FIG. 2C

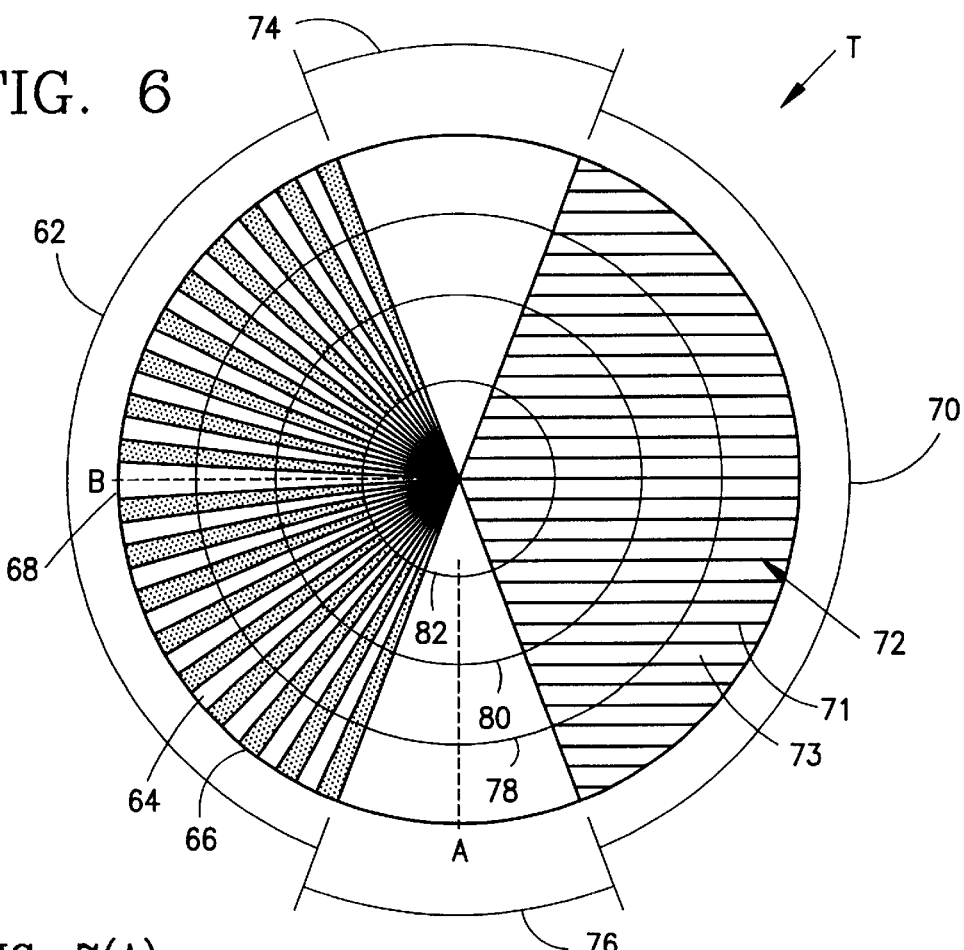
FIG. 6
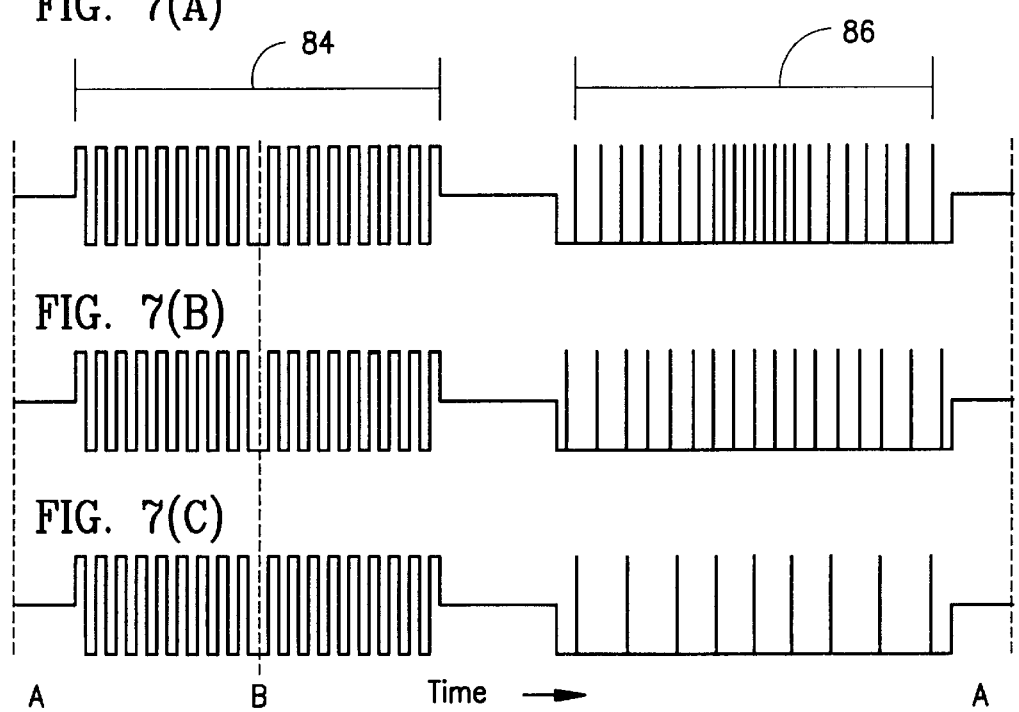
FIG. 7(A)
FIG. 7(B)
FIG. 7(C)

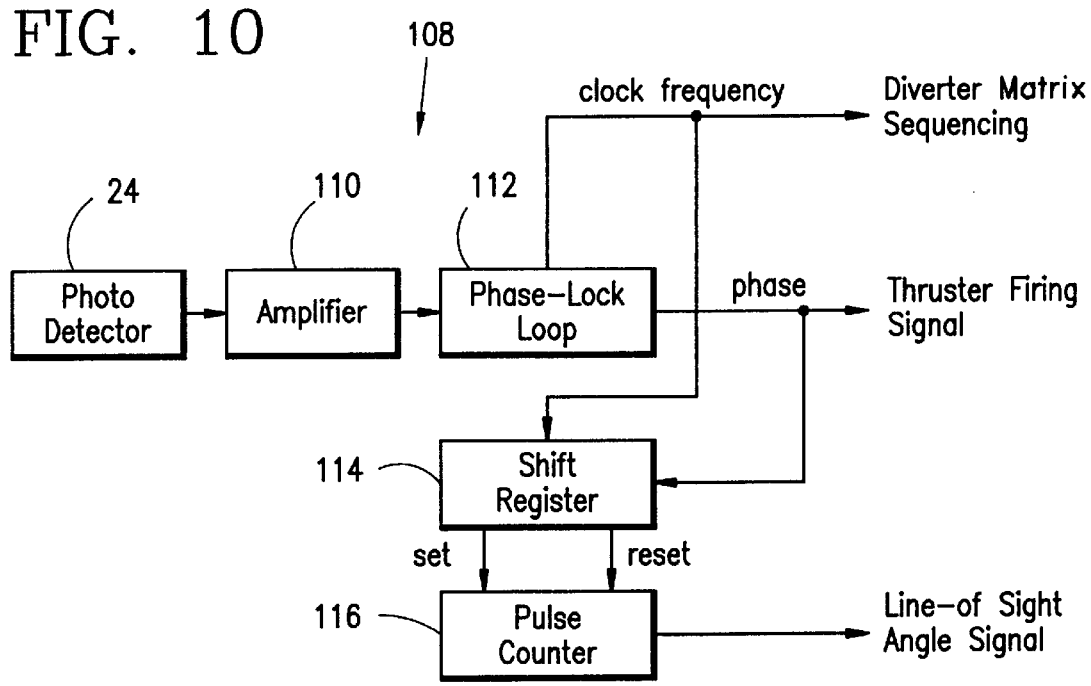
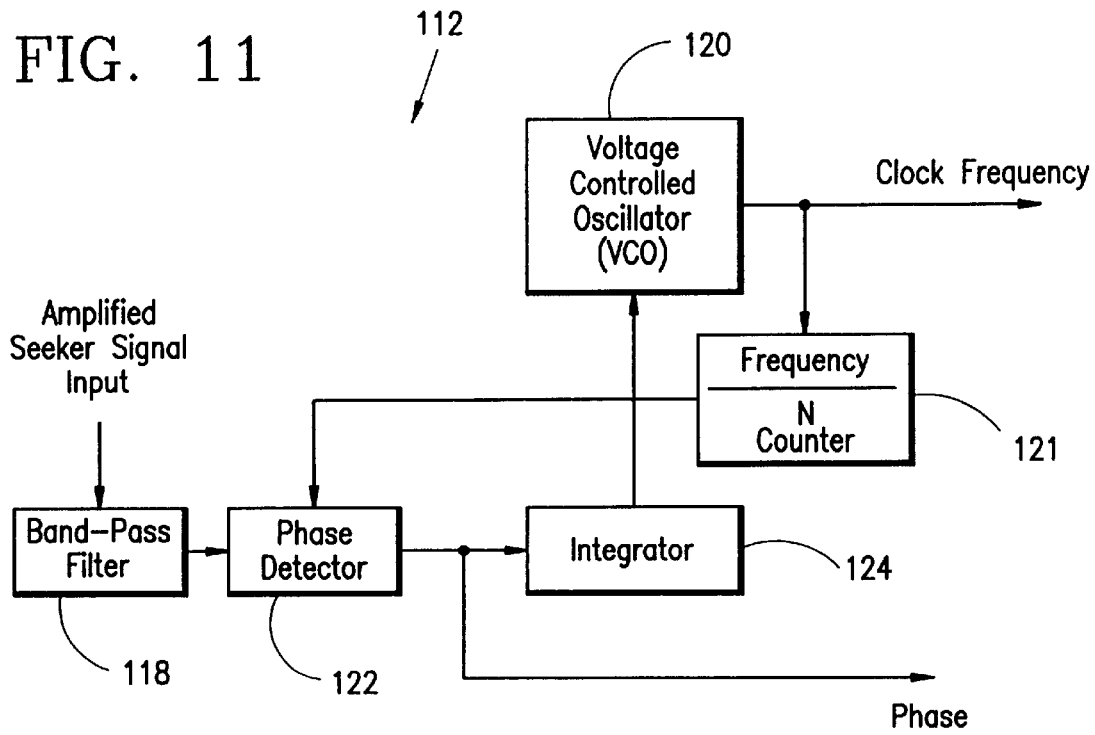

$R_1C_1 \sim T_s$
$R_2C_2 \sim 20T_s$
$T_s$ = Spin Period

Pre-processed Signal

Interpreted Signal

Signal on $R_2C_2$ Low-Pass Filter

Initial Turn-on

Current Flow Charge Diode $D_2$

RETICLE FOR USE IN A GUIDANCE SEEKER FOR A SPINNING PROJECTILE

CROSS-REFERENCE TO RELATED APPLICATIONS

This application is a division of U.S. patent application Ser. No. 09/002,370, filed Jan. 2, 1998 now U.S. Pat. No. 6,076,765, and claims the benefit of U.S. patent applications Ser. No. 60/047,476, filed May 23, 1997 and U.S. Patent Applications Ser. No. 60/034,006, filed Jan. 2, 1997, the disclosures of which applications are incorporated by reference in their entirities herein.

FIELD OF THE INVENTION

The present invention pertains generally to guidance seekers for spinning projectiles and specifically to a guidance seeker utilizing a reticle for determining the instantaneous target location relative to the projectile's spin axis.

BACKGROUND OF THE INVENTION

The present invention is related to applicant's U.S. Pat. No. 5,529,262, which is hereby incorporated by reference. The present invention is also related to provisional applications, Ser. Nos. 60/034,006 and 60/047,476; filed Jan. 2, 1997 and May 23, 1997, respectively, which are incorporated herein by reference.

OBJECTS AND SUMMARY OF THE INVENTION

It is an object of the present invention to provide a guidance seeker for spinning projectiles that uses the projectile inertial properties as a guidance reference.

It is another object of the present invention to provide a guidance seeker with no moving parts.

It is still another object of the present invention to provide a guidance seeker of relatively very low cost, and small size and weight realization, thereby making it particularly suitable for very small caliber spinning projectile applications.

It is another object of the present invention to provide a guidance seeker for spinning projectiles that can be implemented together with all necessary electronic circuitry on a single silicon chip.

It is yet another object of the present invention to provide a guidance seeker that is suitable for a wide variety of small projectile applications, from handgun projectiles to artillery to small tactical missiles.

In summary, the present invention provides a reticle for a guidance seeker for a spinning projectile comprising a substrate for being secured stationary with the spinning projectile; a pattern of a plurality of alternating light modulating structures, such as opaque or light absorbing and light transmitting or light reflecting areas respectively on the substrate, such that an image of a target moving on the substrate in a cyclical fashion will generate (1) a plurality of pulses corresponding to the number of such light transmitting or light reflecting areas crossed by the image, the number of pulses increasing over the spin cycle as the image moves outwardly from the center of the reticle; and (2) the pulse lengths and/or the interstitial time periods between pulses vary in a unique, distinguishable, unambiguous, and singly periodic fashion during the spin cycle. Opaque and light transmitting pertain to refractive optics realizations, while light absorbing and light reflecting pertain to reflective optics. Both embodiments are essentially equivalent in principle, but one or the other may be more advantageous for realization depending on the spectral region of operation.

These and other objects of the present invention will become apparent from the following detailed description.

BRIEF DESCRIPTIONS OF THE DRAWINGS

FIG. 2A is a schematic perspective view of the reticle based on refractive optics embodiment of the present invention disposed inside a projectile equipped with divert thrusters used for course correction.

FIG. 2B is a schematic perspective view of a reticle based on reflective optics embodiment of the present invention disposed inside the projectile FIG. 2A.

FIG. 2C is a schematic side view of the embodiment of FIG. 2B, showing the reticle integrated with the condenser mirror and using reflective and absorbing reticle pattern.

FIG. 6 is yet another embodiment of a reticle made in accordance with the present invention.

FIGS. 7A, 7B and 7C are illustrative signals generated by the reticle of FIG. 6 from three different point targets.

FIG. 10 is a functional block diagram of a signal processing circuit used to extract the signal from the reticle of FIG. 6.

FIG. 11 is a functional block diagram of the phaselock loop circuit block of FIG. 10.

DETAILED DESCRIPTION OF THE INVENTION

Figure 1:
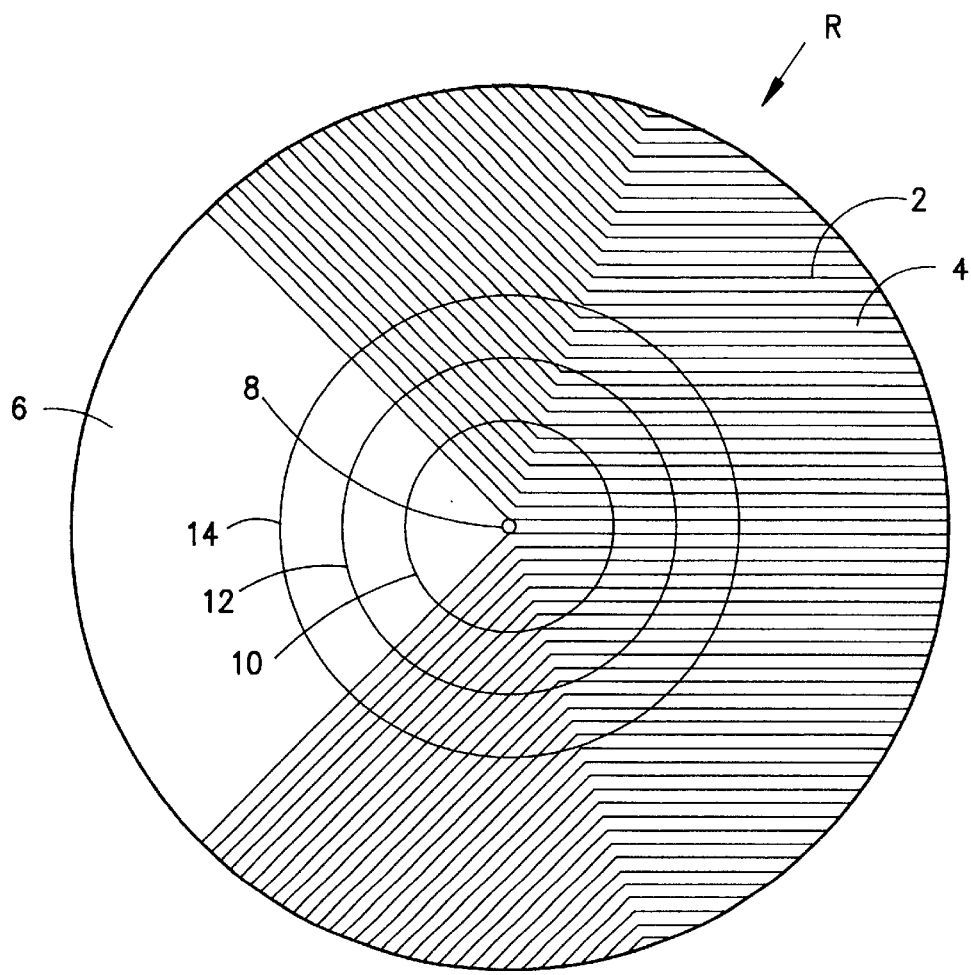
FIG. 1 is a reticle with a chevron-shaped pattern made in accordance with the present invention.

A reticle R in accordance with the present invention is disclosed in FIG. 1. For the refractive optics embodiment, the reticle R includes a light modulating structure made of a plurality of alternating chevron-shaped opaque lines 2 alternating with light transmitting spaces 4 therebetween and a blank light transmitting sector 6. For a reflective optics embodiment, there would be alternating light absorbing and light reflecting regions corresponding to the opaque lines 2 an transmitting spaces 4.

The reticle R is secured to a projectile such that it has no relative motion with respect to the projectile. The reticle R is rotated about its center 8 from the spinning motion of the projectile. The pattern of lines of reticle R is advantageously designed such that a circle drawn about the center 8 by the point image of a target will intersect an increasing number of lines 2 as the radius of the circle increases to provide information on the deviation of the line-of-sight to the target from the projectile, as illustrated by the circles 10, 12 and 14.

The reticle R is implemented, for the refractive optics embodiment, on a substrate which would allow light, infra-red or other radiation that is emitted by or reflected from the target to pass through to a photodetector and be interrupted periodically in accordance with the pattern of light modulating structures of opaque and light transmitting regions. For the reflective optics embodiment, the substrate could be either light transmitting, as in the refractive embodiment, or light reflecting such as a polished metal surface which would carry a similar pattern of light absorbing or nonreflecting regions corresponding to the opaque lines 2. Yet another possibility for this embodiment would be a nonreflecting substrate carrying a pattern of reflecting regions. In either case, the light or infra-red energy impinging onto a suitable detector would be periodically interrupted in a similar fashion as in the refractive optics embodiment.

The reticle R is placed in the image plane of an objective lens 16, or an objective primary mirror 17 as best shown in FIGS. 2A and 2B, respectively. Both are placed inside a spinning projectile 18 such that the reticle R is secured stationary with respect to the projectile, with the optical axis 20 of the lens 16 and the reticle R coinciding with the projectile spin axis, as best shown in FIG. 2A. The same is true for the reflective embodiment, where the optical axis of the objective mirror 17 and the center of the reticle R are aligned with the spin axis of the projectile, as best shown in FIG. 2B. Rotation, in both cases, is imparted to the reticle R by virtue of the projectile spin, since there is no relative motion between the reticle R and the projectile. A condenser lens 22 focuses the light passing through the reticle to a detector 24, such as a photodetector or an infra-red detector. In the reflective case, a condenser mirror 33, or secondary mirror, fulfills the same function. The condenser mirror 33 could simultaneously serve as the substrate for the reticle 35, as best shown in FIG. 2C and so could the condenser lens 22 mentioned above. In both cases, a circuit 26 is operably connected to the detector 24. The circuit 26 provides for sequencing, timing and firing a divert thruster 28. The divert thruster 28 is operably connected to the circuit 26 through firing leads 30. The divert thruster 28 is used to correct the trajectory of the projectile by affecting a lateral motion component upon activation. The reticle-R, detector 24 and the circuit 26 may be implemented on a single chip, in which case the condenser lens 22 would not be needed.

The operation of the reflective embodiment of the reticle will now be described. A person skilled in the art will understand that the operation of the reflective embodiment will be similar.

As the projectile 18 spins about its axis 20, the image 32 of a point target 34 at a radial distance 36 from the center of the reticle, will follow a circular path, such as the circle 10 shown in FIG. 1. As the image crosses the reticle lines, the light from the point target is chopped by the reticle structure, and produces electronic pulse signals at the detector 24. The target image 32 moves in the image plane due to projectile spin, since the reticle R does not move by itself.

Figure 3:
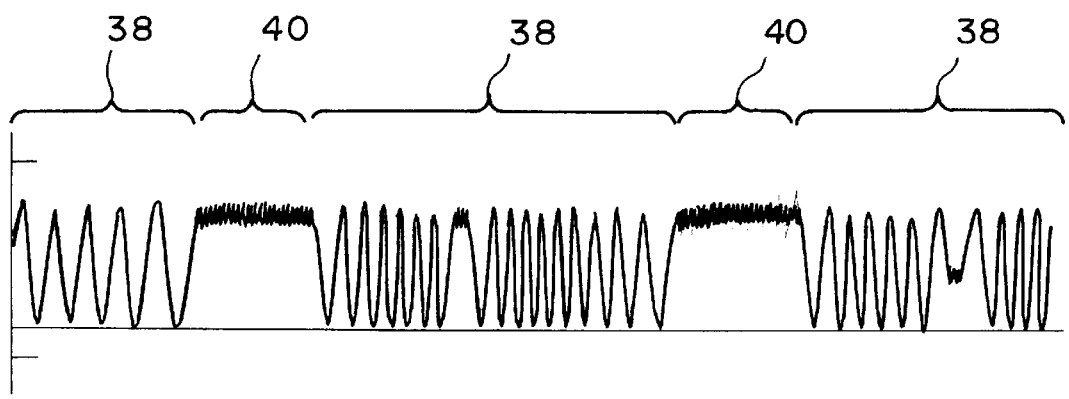
FIG. 3 is an exemplary signal generated by the reticle of the present invention.

An illustrative signal generated by the image 32 as it traces a path around the center of the reticle is shown in FIG. 3. The alternating opaque and light transmitting lines 2 and 4 produce groups of signals 38, one group for each complete revolution of the projectile or reticle about the spin axis. Each group of signals consists of a plurality of pulses, each pulse being generated each time the image 32 crosses an opaque line 2 and into a light transmitting line 4. Each group is separated from the next group by a distinctive signal 40 generated by the image 32 when it traverses the light transmitting area 6. The signal 40 would have maximum amplitude in the case where the area 6 is light transmitting in the refractive embodiment or light reflecting in reflective embodiment, and minimum amplitude in the case where the area 6 is opaque in the refractive example and light absorbing in the reflective embodiment. Maximum amplitude is generated when the image falls on the light transmitting area 6 and minimum amplitude when it crosses an opaque line 2. The pulse count is proportional to the radial distance 36 of the image 32 from the center 8 or spin axis 20 of the projectile, since more opaque and light transmitting lines will be crossed by the image at a greater distance from the center. The radial distance 36 is proportional to an angle 42 that a line-of-sight 44 to the target 34 makes with the projectile spin axis 20, which is along the direction of travel of the projectile, as best shown in FIG. 2A. When the image moves through the blank area 6, a distinctive signal 40 is generated that advantageously separates each group of signals 38. This unique signal is used as a reference point for determining the instantaneous angular position of the image with respect to the reticle center 8 or the projectile axis. The distinctive signal 40 is generated once every complete rotation of the reticle R.

If the target image is centered on the reticle, which means that the projectile axis 20 and the target line-of-sight 44 are coincident, no signals would be generated by the reticle, indicating that the target is in the direction of the projectile axis and that no correction to the projectile course is required. However, if the target deviates from the center of the reticle, the lines 2 and spaces 4 will generate a series of pulses, indicating that the projectile is not pointed at the target. As the projectile farther deviates from the target, the number of pulses generated will increase, since more lines will be crossed at a greater distance from the center, indicating the need for greater course correction. For example, the number of pulses generated by the path 10 will be smaller than either of the paths 12 and 14. Similarly, the number of pulses generated by the path 12 will be less than path 14. A person skilled in the art will understand that as the line-of-sight angle 42 gets larger, the number of pulses generated by the target image on the reticle will also get larger. Conversely, as the line-of-sight angle 42 gets smaller, the number of pulses generated will get smaller. When the angle 42 approaches zero, then the projectile axis will be lined up with the target for a hit.

The divert thruster 28, as disclosed in provisional application Ser. No. 60/056,097, filed Aug. 20, 1997, which is incorporated herein by reference, includes a plurality of propellant or explosive cells 46 disposed in a ring around the projectile center of mass. To correct the bearing of the projectile, a vector force impulse 48 of the appropriate amount, supplied from firing one or more of the explosive cells 46, depending on the radial distance 36, is applied through the center of mass of the projectile along a line passing through the image 32 and the reticle center, such that the angle 42 and the radial distance 36 are reduced to zero. The distinctive signal 40 generated by the target image at the blank sector 6 of the reticle R provides a reference point from which to sequence the firing of the divert thruster 28. The clock frequency generated by the target image moving across the lines 2 and 4 of the reticle R is indicative of the spin rate of the projectile and provides a means for sequencing the firing of each of the explosive cells 46 in the divert thruster 28. Since the timing of the distinctive signal (when the image 32 crosses the sector 6) and the spin rate of the projectile is known, (from these distinctive signals, and therefore also the clock frequency, which is an integer multiple of these distinct signals, whereby the integer is equal to the number of divert thruster cells around the projectile) the timing for each of the explosive cells 46 can be determined as to when it would be positioned along a line passing through the image 32 and the reticle center, at which time it would be fired to provide the vector force for course correction.

As seen from the above, the reticle R has the capability of determining the instantaneous target location in polar coordinates centered about the projectile's spin axis. The parameters measured are the instantaneous radial position of the target image in the image plane, and the corresponding instantaneous angle. These readily transform via the seeker optics, into a line-of-sight angle, and a polar angle in reference to projectile orientation. The former is necessary for determining the course correction required, while the latter is needed to ascertain the precise timing and direction of the course correction.

Figure 4:
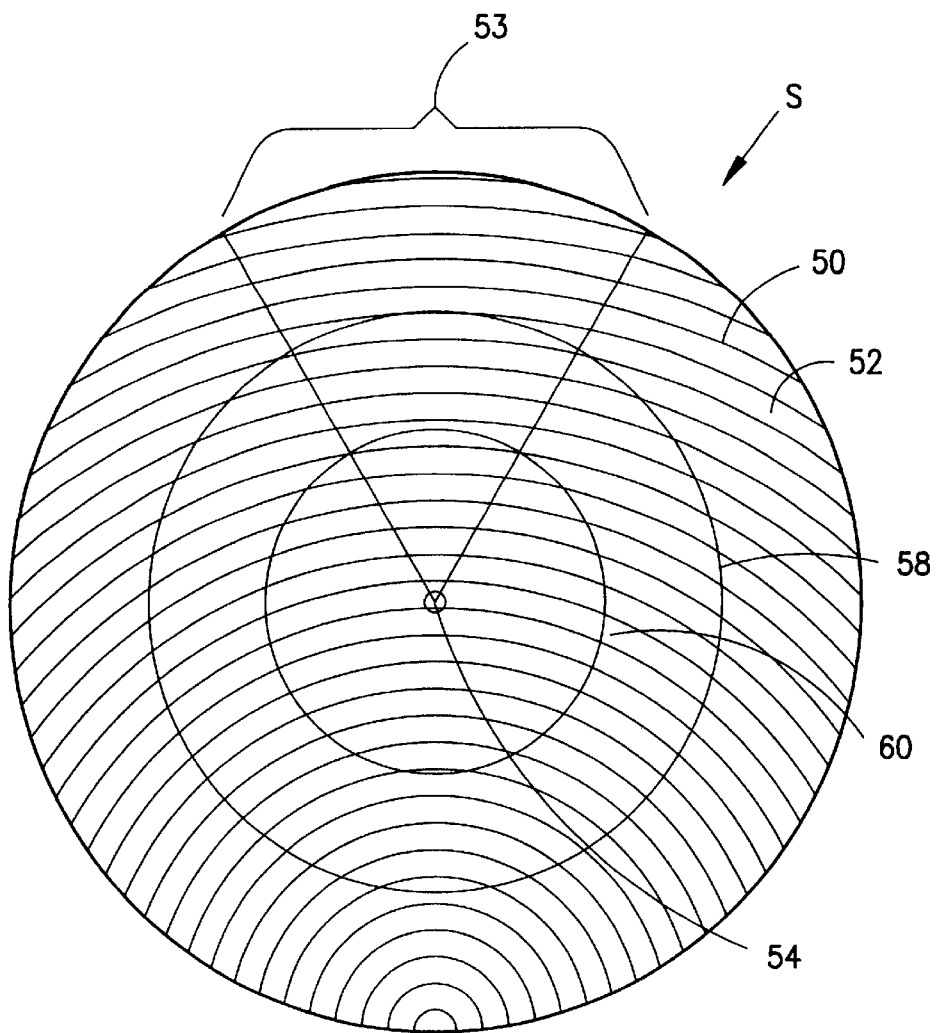
FIG. 4 is yet another embodiment of a reticle made in accordance with the present invention.
Figure 5:
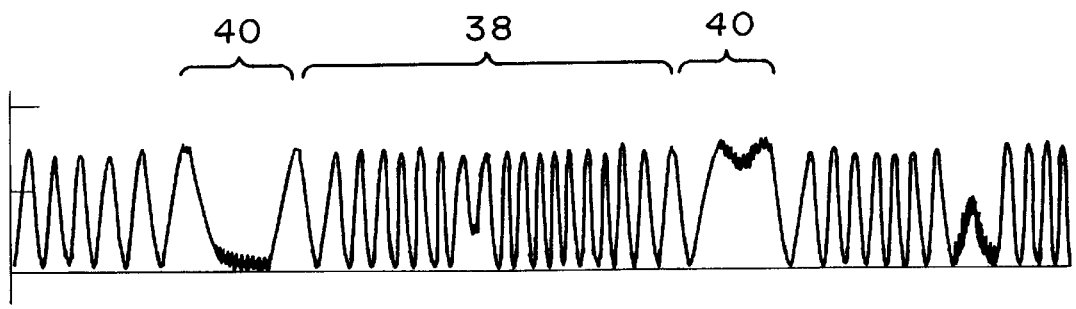
FIG. 5 is an exemplary signal generated by the reticle of FIG. 4.

Another embodiment of a reticle S in accordance with the present invention is disclosed in FIG. 4. The reticle S includes a plurality of light modulating structures of opaque concentric arcs 50 alternating with light transmitting spaces 52 therebetween equally spaced from each other and rotated about an axis 54. As a target image traverses the reticle plane in a circular motion as a result of the rotation of the projectile about the optical axis, which coincides with the projectile axis, a signal pattern similar to that shown in FIG. 5 is generated by the sequence of intersections of the reticle lines 50 and 52 by the image 32 and traversal through a sector area 53. The pulses 38 for each revolution of the reticle are separated by the unique signal 40, which could be a minimum or maximum, depending on whether the image happened to fall on the line or the space. The signal pattern contains information regarding the angular offset 42 (angle of view) of the line-of-sight of the target from the projectile axis and the angular position of the image on the reticle plane. Specifically, the number of reticle lines crossed by the target image 32 is proportional to the angle of view, and the maximum time interval between reticle crossings, generally indicated at 53, generating a distinctive signal every complete revolution of the reticle, that occurs at the time when the target image path is substantially parallel to the arcs 50. These two parameters, the number of Limes crossed and the longest interval between line crossings, are measurable and are necessary and sufficient for obtaining a converging guidance solution. As with the reticle R, a greater number of-pulses are generated per revolution of the reticle as the image 32 drifts radially outwardly from the rotation axis 54, indicating that the target is drifting away from the path of the projectile. For example, path 58 will generate more pulses than path 60, since more reticle lines will be crossed at the outer radial distances.

Another embodiment of a reticle T in accordance with the present invention is disclosed in FIG. 6. The reticle T consists of a wide sector 62 of light modulating structures of alternating light transmitting and opaque narrow sectors 64 and 66, respectively. The narrow sectors reverse in sequence at the center 68 where there is a double width of light transmitting narrow sector 64. The change in the sequence at 68 represents a phase jump of 180°, which provides a unique, unambiguous, detectable and singly periodic signal for each rotation of the reticle, advantageously providing a reference point for firing a divert thruster to correct the trajectory of the projectile.

Another wide sector 70 is provided on the reticle T and consists of a plurality of parallel opaque lines 72 of equal spacing. The parallel lines 72 divide the sector 70 into alternating light transmitting and opaque portions 71 and 73, respectively.

The wide sectors 62 and 70 can be separated by semi-transparent sectors 74 and 76 with no structure. The unstructured sectors 74 and 76 advantageously provide signal group separations in time, depending on the signal processing requirements. Typical angular width for the unstructured sectors 74 and 76 can range from 0 to quite significant angles of 90 degrees or even greater.

The operation of the reticle T will now be described, using three point targets as seen by the reticle from different line-of-sight angles. As the projectile 18 spins about its axis, the images of the three targets will follow circular paths 78, 80 and 82, as best shown in FIG. 6. The light from the point targets is thus chopped by the reticle structure, and produces electronic signals at the photodetector 24, as best shown in FIGS. 7A, 7B and 7C. Starting at A in FIG. 6, the target images move clockwise in the image plane due to projectile spin. The wide sector 62 with alternating light and opaque narrow sectors produce periodic signals 84 with the phase jump of 180 degrees at B. These periodic signals are independent of the line-of-sight angles, and are identical for all three targets. After crossing the semi-transparent area 74, the target images enter the wide sector 70 of parallel lines. The lines 72 are intercepted, producing pulse sequences 86, the counts of which are proportional to the radial distances of the targets from the center. The target farthest away from the center of the reticle, corresponding to the circular trace 78 on the reticle T, produces the pulse sequence 86 shown in FIG. 7(A). The target associated with the circular trace 80 produces the pulse sequence 86 shown in FIG. 7(B). The target nearest to the center of the reticle, corresponding to the circular trace 82, generates the pulse sequence 86 shown in FIG. 7(C).

If the target image is centered on the reticle, which means that the projectile axis and the target line-of-sight are coincident, no signals would be generated by the reticle, indicating that no correction to the projectile course is required. However, if the target deviates from the center of the reticle, the parallel lines 72 will generate a series of pulses, indicating that the projectile is drifting away from its intended course. As the projectile farther deviates from the target, the number of pulses generated will increase, indicating greater course correction. The discontinuity between the first and second series of pulses advantageously provides a reference point for firing a divert thruster to correct the trajectory of the projectile.

Figure 8:
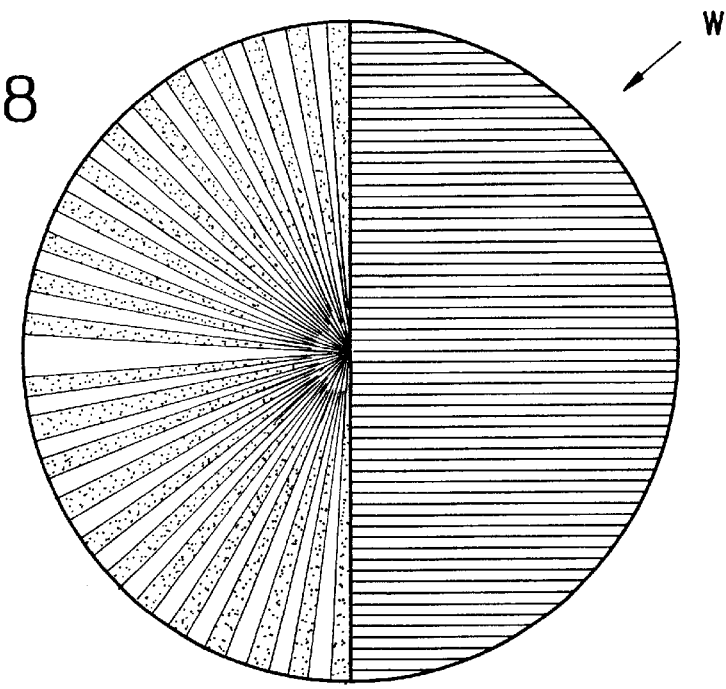
FIG. 8 is yet another embodiment of a reticle made in accordance with the present invention.

Another embodiment of a reticle W is disclosed in FIG. 8. The reticle W is similar to reticle T, except that it does not have the blank areas 74 and 76. Its operation is the same as reticle T.

Figure 9:
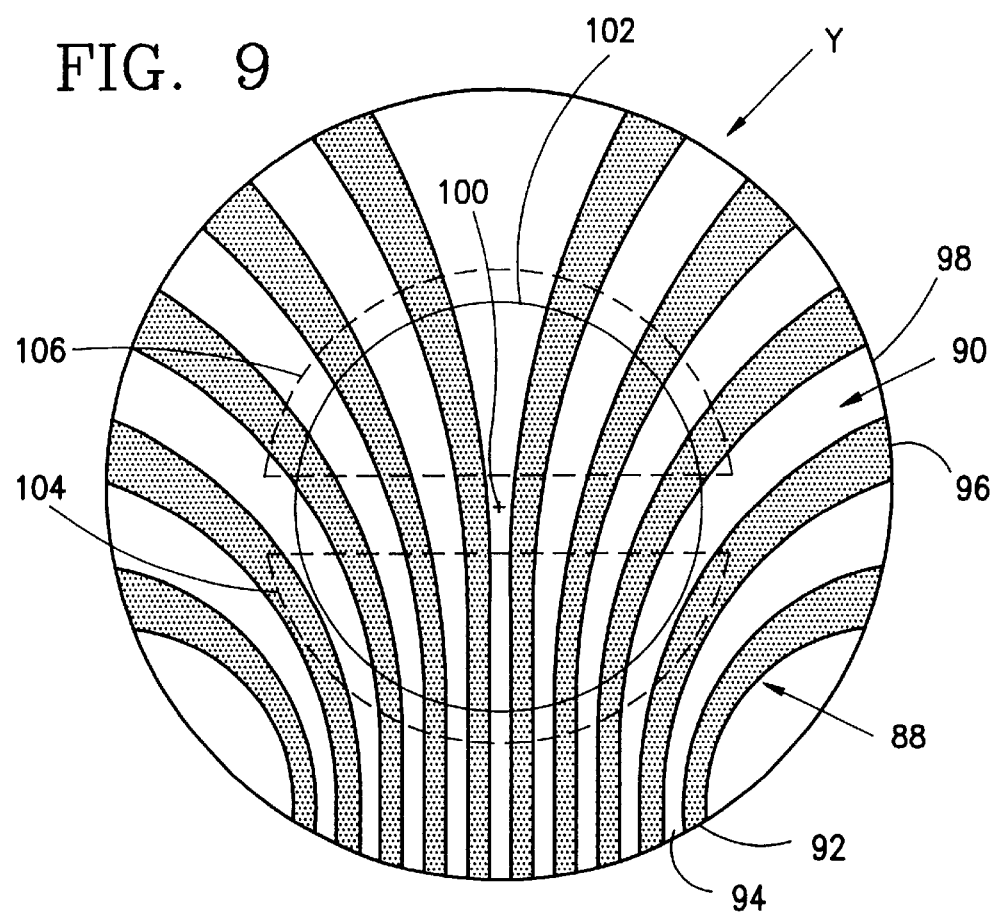
FIG. 9 is still another embodiment of a reticle made in accordance with the present invention.

Yet another embodiment of a reticle Y is disclosed in FIG. 9. The reticle Y comprises a plurality of alternating light transmitting and opaque structures 88 and 90, each of which is thinner at ends 92 and 94 and gradually thickens toward the other ends 96 and 98. The structures 88 and 90 are closer together at one area of the reticle and further apart at another area. The structures 88 and 90 can be light absorbing and light reflecting, respectively, when working in some part of the spectrum, such as the infrared region.

When the reticle Y is rotated about its center 100 due to the spinning of the projectile, a circle 102 traced by an image of a target will cross the structures 88 and 90, generating a plurality of pulses at the detector 24. The pulses will be higher frequency when the image traverses the region 104 where the structures 88 and 90 are closer together and lower frequency in the region 106 where the structures are farther apart. This change in frequency occurs for each rotation of the reticle and is detectable to provide an angular reference. It is seen that the width of the structures 88 and 90 vary in a unique, distinguishable, unambiguous, and singly periodic fashion during the rotation to provide a reference point for sequencing the divert thrusters used to correct the trajectory of the projectile. The number of pulses generated corresponds to the radial distance of the image from the center. The farther away the image is from the center, the greater number of structures similar to 88 and 90 that are traversed.

The electronic extraction of guidance signals is illustrated using the signal generated by the reticle T (FIG. 6). An exemplary processing circuit 108 is disclosed in FIG. 10. The photodetector signal is amplified by amplifier 110 and applied to a phase-lock loop circuit 112, which produces a steady clock signal at the frequency of the intersection with the alternating reticle structures and a pulse signal at the instant of the phase discontinuity. The clock frequency and the phase discontinuity signal are used for the sequencing of the diverter matrix 28 and the thruster firing, respectively. Furthermore, they are used together for the extraction of the line-of-sight angles by means of a shift register 114 and a pulse counter 116.

The phase-lock loop block 112 is broken down into its elements, as best shown in FIG. 11. The amplified seeker signal is applied via a band-pass filter 118, together with the output of a voltage controlled oscillator (VCO) 120, to a phase detector 122 via a divide by N counter 121, where N is the number of elements 46 in the divert thruster 28. The phase detector 122 measures the instantaneous phase difference of the two signals, and via an integrator 124 determines the frequency difference, and tunes the VCO frequency so that it matches the input frequency. The instantaneous phase jump is available at the output of the phase detector 122, but does not influence the VCO tuning. The VCO frequency is thus phase-locked to the input signal.

Figure 12:
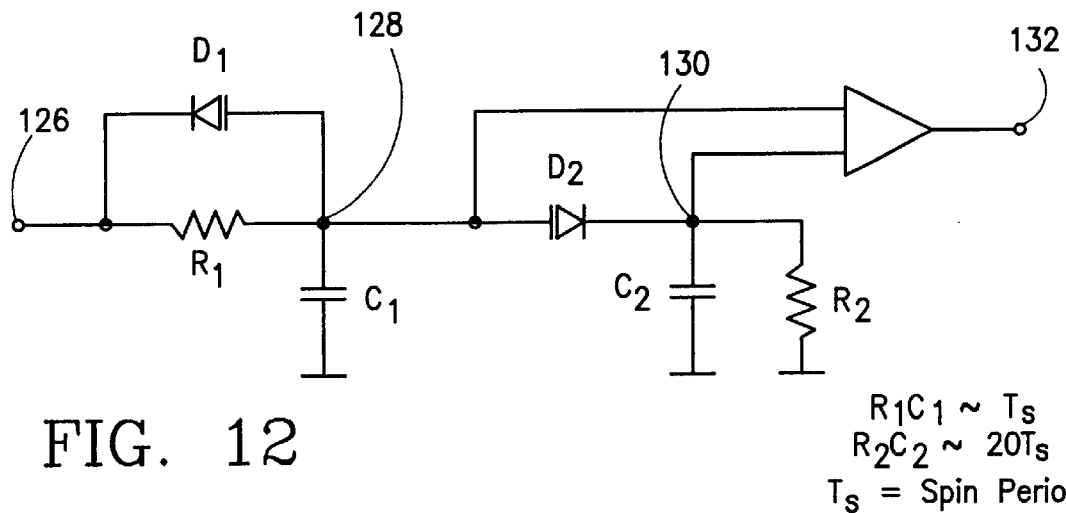
FIG. 12 is an exemplary circuit that may be used for processing the signal generated by a reticle of the present invention.
Figure 13A:
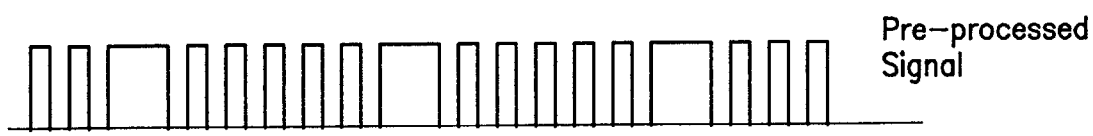
FIGS. 13A, 13B, 13C and 13D are waveforms generated at various points in the circuit of FIG. 10.
Figure 13B:
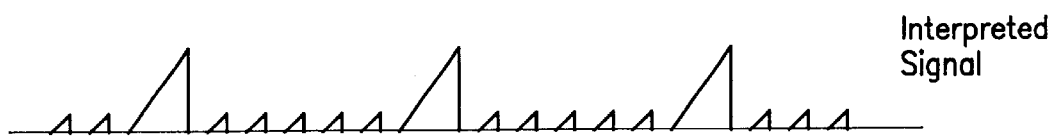
Figure 13C:
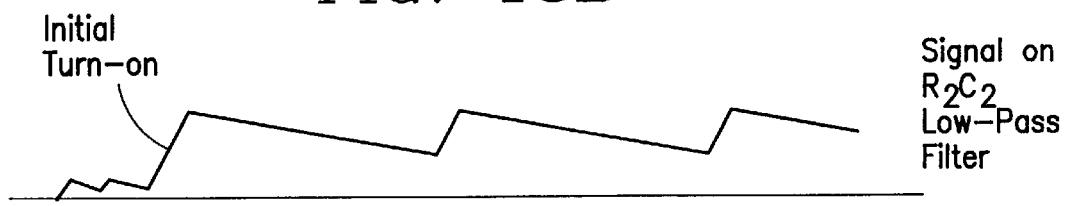
Figure 13D:

Another exemplary circuit is disclosed in FIG. 12 to illustrate the extraction of the long pulse from the reticle signal generated by the reticle R (FIG. 1). The long pulse provides the unique, unambiguous, detectable and singly periodic signal for each rotation of the reticle. Preprocessed signal from the detector, shown in FIG. 13A, is input to the circuit at 126. Output signal at 128, shown in FIG. 13B, is input to a low-pass filter, generating a signal shown in FIG. 13C at 130. The output signal from the differential amplifier at 132 is shown in FIG. 13D.

The various exemplary circuits illustrated herein may be implemented digitally, wherein the signal from the reticle is digitized by an analog/digital converter and processing is done by a microprocessor programmed with appropriate algorithms simulating the operations performed by the analog circuits.

The above reticle embodiments are representative of a large number of reticle configurations which could yield similar signal output under the same circumstances. All these reticles provide two common characteristics which essentially determine their usefulness for guiding spinning projectiles, namely:

(1) A target image moving on such reticle about an optical axis in a circular pattern will produce reticle line crossings the number of which is a monotone increasing (but preferentially linear) function of the radius of the circular path of the image.

(2) The pulse lengths and/or the interstitial time periods between pulses vary in a unique, distinguishable, unambiguous, and singly periodic fashion during the spin cycle. Same as the change in pulse length from a maximum to a minimum, any other distinct, predominant, and readily detectable feature of the signal would be equally useful, if it behaved similarly for every completion of the full circle (360 degrees rotation).

The reticles disclosed herein may be implemented on any suitable substrate, such as the refractive and reflective embodiments discussed above that will permit light or infrared radiation to pass through or be reflected therefrom and be detected by a photodetector. Other materials may be used, depending on the specific radiation emitted by or reflected from the target. The reticles may even be deposited directly on the active surface of a photodetector chip. The timing, sequencing and firing circuits for the diverters may also be implemented on the same chip.

The present invention provides a guidance seeker that has relatively low cost and small size realization, making it particularly suitable for very small caliber spinning projectile applications.

While this invention has been described as having a preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

What is claimed is:

1. A reticle for a guidance seeker, comprising:
   a) a substrate having a center of rotation; and
   b) an alternating pattern of light modulating structures disposed on said substrate along a 360 degree path about said center of rotation such that when an image of a target formed on said substrate moves along said path said image generates a plurality of pulses corresponding to a number of said structures crossed by said image, a number of said plurality of pulses changing as said image moves outward radially from said center of rotation;
   wherein said plurality of pulses form guidance control signals including a unique, unambiguous and singly periodic signal for each rotation of said substrate to provide an instantaneous target location in polar coordinates centered about said center of rotation, and wherein said polar coordinates are indicative of a line of sight angle between said center of rotation and a target line of sight for determining course correction and include a polar angle component in reference to said center of rotation and said image for determining timing and direction for applying a vector force along a line through said image and said center of rotation such that said line of sight angle is reduced.

2. A reticle as in claim 1, wherein said structures include light transmitting and opaque lines.

3. A reticle as in claim 1, wherein said structures include light reflecting and light absorbing lines.

4. A reticle as in claim 1, wherein said structures include chevron-shaped lines.

5. A reticle as in claim 1, wherein said structures include concentric arcs.

6. A reticle as in claim 1, wherein said structures include radial lines and parallel lines.

7. A reticle as in claim 1, wherein said structures include an area on said substrate adapted to generate said unique, unambiguous and singly periodic signal.

8. A reticle as in claim 7, wherein said area is light transmitting.

9. A reticle as in claim 7, wherein said area is light absorbing.

10. A reticle as in claim 1, wherein said substrate includes a first area where said structures are grouped closer together and a second area where said structures are grouped farther apart along said path.

11. A method for generating a guidance signal for a projectile spinning about a spin axis, comprising the steps of:
 a) providing a reticle secured stationary with respect to the projectile, the reticle having a pattern of alternating light modulating structures disposed along a path coinciding with the spin axis;
 b) allowing the reticle to rotate with the projectile about the spin axis;
 c) forming an image of a target on the reticle;
 d) generating a plurality of pulses from the relative motion of the target image on the reticle as the image crosses the alternating light modulating structures for each rotation of the reticle, the plurality of pulses being indicative of a line of sight angle between the spin axis and a target line of sight for determining course correction, whereby an absence of the plurality of pulses indicates that the projectile is on course;
 e) extracting a unique, unambiguous and singly periodic signal from the plurality of pulses to provide an instantaneous target location in polar coordinates centered about the spin axis for each rotation of the reticle; and
 f) determining, from a polar angle component of the polar coordinates, timing and direction for applying a vector force through a center of mass of the projectile along a line through the image and the spin axis such that the line of sight angle is reduced.

12. A reticle for a guidance seeker, comprising:
 a) a substrate having a center of rotation;
 b) a plurality of alternating light modulating structures disposed on said substrate;
 c) said plurality of alternating modulating structures being disposed on said substrate such that an image of a target tracing a path on said substrate about said center of rotation crosses a greater number of said structures as a radial distance of said image from said center of rotation increases; and
 d) a width of said structures vary in a unique, distinguishable, unambiguous and singly periodic fashion along said path to provide an instantaneous target location in polar coordinates centered about said center of rotation, wherein said polar coordinates are indicative of a line of sight angle between said center of rotation and a target line of sight for determining course correction and include a polar angle component in reference to said center of rotation and said image for determining timing and direction for applying a vector force along a line through said image and said center of rotation such that said radial distance of said image from said center of rotation is reduced.

13. A reticle as in claim 12, wherein said structures include light transmitting and opaque spaces.

14. A reticle as in claim 12, wherein said structures include light reflecting and light absorbing spaces.

15. A reticle for a guidance seeker, comprising:
 a) a substrate having a center of rotation;
 b) a pattern of a plurality of alternating opaque and light transmitting lines disposed along a 360 degree path about said substrate such that an image of a target moving on said substrate generates a plurality of pulses corresponding to a number of lines crossed by said image, said plurality of pulses increasing as said image moves outward radially from said center of rotation; and
 c) a blank area on said substrate such that a time interval for said image to traverse said blank area is substantially greater than a time interval for said image to traverse successive opaque lines;
 wherein said plurality of pulses form guidance control signals including a unique, unambiguous and singly periodic signal for each rotation of said substrate to provide an instantaneous target location in polar coordinates centered about said center of rotation, and wherein said polar coordinates are indicative of a line of sight angle between said center of rotation and a target line of sight for determining course correction and include a polar angle component in reference to said center of rotation and said image for determining timing and direction for applying a vector force along a line through said image and said center of rotation such that said line of sight angle is reduced.

16. The reticle as claimed in claim 1 wherein an amount of force of said vector force is proportional to a radial distance component of said polar coordinates such that a greater amount of force is applied as said radial distance component increases.

17. The method as claimed in claim 11 wherein an amount of force of the vector force is proportional to a radial distance component of the polar coordinates such that a greater amount of force is applied as the radial distance component increases.

18. The reticle as claimed in claim 12 wherein an amount of force of said vector force is proportional to said radial distance such that a greater amount of force is applied as said radial distance increases.

19. The reticle as claimed in claim 15 wherein a greater amount of said vector force is applied as said image moves outward radially from said center of rotation of said substrate.

\* \* \* \* \*